(12) United States Patent
Nations et al.

(10) Patent No.: US 9,024,954 B2
(45) Date of Patent: May 5, 2015

(54) DISPLAYING PARTIAL LOGOS

(75) Inventors: Gregory M. Nations, Minneapolis, MN (US); Chad R. Gourley, Elk River, MN (US); Michael F. Gonsalves, Minneapolis, MN (US); Troy Neidermire, Minneapolis, MN (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 142 days.

(21) Appl. No.: 13/339,170

(22) Filed: Dec. 28, 2011

(65) Prior Publication Data

US 2013/0169647 A1 Jul. 4, 2013

(51) Int. Cl.
*G06T 13/00* (2011.01)
*G06T 1/00* (2006.01)
*G06T 13/20* (2011.01)

(52) U.S. Cl.
CPC ..................................... *G06T 13/20* (2013.01)

(58) Field of Classification Search
None
See application file for complete search history.

(56) References Cited

U.S. PATENT DOCUMENTS

| | | |
|---|---|---|
| D109,791 S | 5/1938 | Sonin |
| 5,423,139 A | 6/1995 | Feldman |
| 5,530,759 A | 6/1996 | Braudaway et al. |
| 5,644,735 A | 7/1997 | Luciw et al. |
| 5,956,709 A | 9/1999 | Xue |
| D415,483 S | 10/1999 | Decker |
| 6,014,634 A | 1/2000 | Scroggie et al. |
| 6,026,376 A | 2/2000 | Kenney |
| 6,032,130 A | 2/2000 | Alloul et al. |
| 6,055,573 A | 4/2000 | Gardenswartz et al. |
| 6,141,666 A | 10/2000 | Tobin |
| 6,182,871 B1 | 2/2001 | Lam |
| 6,298,330 B1 | 10/2001 | Gardenswartz et al. |
| 6,542,927 B2 | 4/2003 | Rhoads |
| 6,604,681 B1 | 8/2003 | Burke et al. |
| 6,766,212 B1 | 7/2004 | Dean |
| 6,965,376 B2 | 11/2005 | Tani et al. |
| 7,002,573 B2 | 2/2006 | Trotta et al. |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

Wayback Machine Archives for http://www.target.com/ as it appeared on Nov. 20, 2007, pp. 1-2.*

(Continued)

*Primary Examiner* — Kee M Tung
*Assistant Examiner* — Frank Chen
(74) *Attorney, Agent, or Firm* — Merek, Blackmon & Voorhees, LLC

(57) ABSTRACT

A processor serves instructions that set a position of a banner having a shadow line and a position of an image of a partial logo having a line crossing at least part of the partial logo, wherein the position of the image of the partial logo is set based on the position of the banner, a dimension of the banner, and a position of the line crossing the partial logo. An image of the banner having the shadow line is retrieved and served. An image of the partial logo is retrieved and served. The rendered banner and partial logo display the partial logo such that the line crossing the partial logo is aligned with a shadow line on the banner.

20 Claims, 10 Drawing Sheets

(56) References Cited

U.S. PATENT DOCUMENTS

| | | |
|---|---|---|
| 7,010,876 B1 | 3/2006 | Siegel et al. |
| 7,055,130 B2 | 5/2006 | Charisius et al. |
| 7,062,453 B1 | 6/2006 | Clarke |
| 7,263,499 B2 | 8/2007 | Kunigita |
| 7,284,206 B2 | 10/2007 | Ozawa et al. |
| 7,409,362 B2 | 8/2008 | Calabria |
| 7,503,502 B2 | 3/2009 | Montague |
| D590,412 S | 4/2009 | Saft et al. |
| 7,529,797 B2 | 5/2009 | Tseng et al. |
| D599,373 S | 9/2009 | Kobayashi et al. |
| 7,603,292 B1 | 10/2009 | Bragg et al. |
| 7,613,687 B2 | 11/2009 | Nye |
| 7,643,651 B2 | 1/2010 | Asai |
| 7,676,387 B2 | 3/2010 | Childress et al. |
| 7,702,542 B2 | 4/2010 | Aslanian |
| D619,613 S | 7/2010 | Dunn |
| D622,280 S | 8/2010 | Tarara |
| D625,323 S | 10/2010 | Matsushima et al. |
| D626,133 S | 10/2010 | Murphy et al. |
| 7,890,378 B2 | 2/2011 | Clarke et al. |
| 7,996,282 B1 | 8/2011 | Scott et al. |
| 8,001,003 B1 | 8/2011 | Robinson et al. |
| D644,663 S | 9/2011 | Gardner et al. |
| D656,950 S | 4/2012 | Shallcross et al. |
| 8,244,590 B2 | 8/2012 | Rothman |
| 8,250,145 B2 | 8/2012 | Zuckerberg et al. |
| 2001/0029465 A1 | 10/2001 | Strisower |
| 2002/0018076 A1 | 2/2002 | Gianola |
| 2002/0046105 A1 | 4/2002 | Gardenswartz et al. |
| 2002/0165799 A1 | 11/2002 | Jaffe et al. |
| 2003/0014501 A1 | 1/2003 | Golding et al. |
| 2003/0016241 A1 | 1/2003 | Burke |
| 2003/0050848 A1 | 3/2003 | Defayette et al. |
| 2005/0040230 A1 | 2/2005 | Swartz et al. |
| 2005/0055321 A1 | 3/2005 | Fratkina et al. |
| 2005/0081251 A1 | 4/2005 | Walker et al. |
| 2005/0144093 A1 | 6/2005 | Kassan |
| 2005/0147054 A1 | 7/2005 | Loo et al. |
| 2005/0149269 A1 | 7/2005 | Thomas et al. |
| 2005/0270302 A1* | 12/2005 | Weast ........................ 345/590 |
| 2006/0053066 A1 | 3/2006 | Sherr et al. |
| 2006/0103130 A1 | 5/2006 | Koivukunnas et al. |
| 2006/0277103 A1 | 12/2006 | Fujita et al. |
| 2006/0277477 A1 | 12/2006 | Christenson |
| 2007/0022020 A1 | 1/2007 | Bernstein |
| 2007/0078850 A1 | 4/2007 | Aziz et al. |
| 2007/0095615 A1 | 5/2007 | Spector |
| 2007/0162850 A1 | 7/2007 | Adler et al. |
| 2007/0192168 A1 | 8/2007 | Van Luchene |
| 2007/0226189 A1 | 9/2007 | Piekos et al. |
| 2007/0244883 A1 | 10/2007 | Bessieres et al. |
| 2007/0244900 A1 | 10/2007 | Hopkins et al. |
| 2007/0300261 A1 | 12/2007 | Barton et al. |
| 2008/0005125 A1 | 1/2008 | Gaedeke |
| 2008/0077487 A1 | 3/2008 | Davis et al. |
| 2008/0097844 A1 | 4/2008 | Hsu et al. |
| 2008/0133500 A1 | 6/2008 | Edwards et al. |
| 2008/0147640 A1 | 6/2008 | Schachter |
| 2008/0235085 A1 | 9/2008 | Kovinsky et al. |
| 2008/0255962 A1 | 10/2008 | Chang et al. |
| 2008/0270248 A1 | 10/2008 | Brill |
| 2008/0270250 A1 | 10/2008 | Bolivar et al. |
| 2009/0037355 A1 | 2/2009 | Brave et al. |
| 2009/0106085 A1 | 4/2009 | Raimbeault |
| 2009/0106113 A1 | 4/2009 | Arora et al. |
| 2009/0132388 A1 | 5/2009 | Omori et al. |
| 2009/0164315 A1 | 6/2009 | Rothman |
| 2009/0164323 A1 | 6/2009 | Byrne |
| 2009/0171812 A1 | 7/2009 | Fadell |
| 2009/0173792 A1 | 7/2009 | Montague |
| 2009/0199115 A1 | 8/2009 | Singh |
| 2009/0265968 A1 | 10/2009 | McNamee |
| 2009/0273612 A1 | 11/2009 | Xie |
| 2009/0292599 A1 | 11/2009 | Rampell et al. |
| 2009/0299965 A1 | 12/2009 | Aziz et al. |
| 2009/0307100 A1 | 12/2009 | Nguyen et al. |
| 2009/0313117 A1* | 12/2009 | Hu .............................. 705/14.49 |
| 2010/0073398 A1 | 3/2010 | Fisher et al. |
| 2010/0100447 A1 | 4/2010 | Ganz |
| 2010/0114720 A1 | 5/2010 | Jones et al. |
| 2010/0179876 A1 | 7/2010 | Holte |
| 2010/0186066 A1 | 7/2010 | Pollard |
| 2010/0198697 A1 | 8/2010 | Brown et al. |
| 2010/0223082 A1 | 9/2010 | Becker et al. |
| 2011/0029368 A1 | 2/2011 | Hsu et al. |
| 2011/0086702 A1* | 4/2011 | Borst et al. ........................ 463/30 |
| 2011/0125569 A1 | 5/2011 | Yoshimura et al. |
| 2011/0153451 A1 | 6/2011 | Bitz et al. |
| 2011/0173095 A1 | 7/2011 | Kassaei et al. |
| 2011/0225152 A1 | 9/2011 | Beaudreau et al. |
| 2011/0302498 A1 | 12/2011 | Gorodyansky |
| 2012/0001939 A1* | 1/2012 | Sandberg ........................ 345/633 |
| 2012/0079390 A1* | 3/2012 | Ballagh et al. ................ 715/738 |
| 2012/0159294 A1 | 6/2012 | Gonsalves et al. |
| 2012/0166945 A1 | 6/2012 | Roberts et al. |

FOREIGN PATENT DOCUMENTS

| | | |
|---|---|---|
| WO | WO 00/79446 | 12/2000 |
| WO | WO 01/45020 | 6/2001 |
| WO | WO 01/84447 | 11/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

"Target" Internet Archive WaybackMachine for http://www.target.com/on on Nov. 29, 2007.*

TGT—Target Financial Community Meeting, Jan. 21, 2010.

Steve Eastman Presentation, Target Managers Meeting, Mar. 15, 2010.

Office Action from Canadian Patent Application No. 2,779,702, mailed Nov. 23, 2012 (4 pages).

Dave Ragget et al., "HTML 4.01 Specification," Dec. 24, 1999 (301 pages).

Amazon, search Results for Columbia 100% cotton Towels, Retneved Aug. 10, 2011 from the Internet at: http://www.amazon.com/gp/search/ref=sr_nr_scat_1 0789941_1n?rh=n%3A10789941 %2Ck%3Acotton+bath+towels&keywords=cotton+bath+towels&ie=UTF8&qid=1312572186&scn=1 0789941 &h=5ec5aedf63cc88f6e48fda6b27c85681 ae 7a21 ba, 6 pages.

Amazon.com Universal Wish List, [Online]. Dec. 20, 2010, Retrieved from the Internet at: http://www.amazon.com/b/?ie=UTF8&node=2223317011 &tag=googhydr-20&hvadid=3877744091 &ref=pd_sl_37ck7ovrfc_b, 3 pages.

Bedding & Bath, http://fvvww.kohls.com/kohlsStore/bedandbath/towels/decorativetowels.jsp?bmForm=guided_nav-search&Sub-catFolderiD=2534374752660882, at least as early as Mar. 29, 2011 (2 pages).

Best Buy, Every Day Laptops, [Online], Dec. 13, 2009, Retrieved from the Internet at: http://www.bestbuy.com/site/Laptop-Computers/Everyday-Laptops, 4 pages.

BestBuy, Search Results for "iT", Retrieved Aug. 5, 2011 from the Internet at: http:f/www.bestbuy.com/site/olspage.jsp;jsessionid=9B6687FFBB3C82, 8 pages.

Canon Digital Rebel XT Review (www.dcviews.com, Jul. 4, 2007, 5 pages.

Office Action from Canadian Patent Application No. 2.761,936, mailed Jul. 16, 2012 (3 pages).

Office Action from Canadian Patent Application No. 2.761,936, mailed Nov. 21, 2012 (3 pages).

Office Action from Canadian Patent Application No. 2.761,936, mailed Apr. 18, 2013 (3 pages).

Office Action from Canadian Patent Application No. 2.761,560, mailed Apr. 18, 2013 (3 pages).

Office Action from Canadian Patent Application No. 2,781,784, mailed Nov. 27, 2012 (4 pages).

(56) References Cited

OTHER PUBLICATIONS

Eddie Bauer.com,, [Online] Dec. 20, 2010, Retrieved from the Internet at: https://www.eddiebauer.com/checkout/bag.jsp?&categoryId=95&categoryName=SWEATERS--CARDI-GANS&pCategoryId=3&pCategoryName=WOMEN&gpCategoryId=1&gpCategoryName=EB#ppl=%7Btype%3A%22transition%22%2CensembleId%3A%2236211-%22%2CformatStr%3A%22product%22%2CpassedId0bj%3A%7B%22ensembleId%22%3A%2236211%22%7D%2CcategoryId%-3A%2227411%22%2CpathInfo%3A%22undefined%.

Etihad Airways Home Page, Retrieved Aug. 10, 3011 from the Internet at: http://www.etihadairways.com/sites/etihad/us/en/home/pages/home.aspx?cid=ppc_start, 1 page.

Facebook Adds Profile Preview Feature [Online], Jan. 7, 2010, Retrieved from the Internet at: http://www.allfacebook.com/facebook-adds-profile-preview- feature-2008-09, 5 pages.

Facebook Developers Facebook Connect, Build and grow with Facebook Connect, [Online] Dec. 18, 2009, Retrieved from the Internet at: http://developers.facebook.com/connecl.php, 2 pages.

Google Product search results for "Canon Powershot", Retrieved Mar. 5, 2010 from the Internet at: http://www.google.com/products?q=canon+powershot&aq=O&oq=canon+p, 3 pages.

HP Support, Search Results for "HP Pavilion dv7t-1 000" I FAQ, Retrieved Mar. 25, 2010 from the Internet at:http://h10061.www1.hp.com/ccsearch/search?pname=H P+Pavilion+dv7t-1000+CTO+Ent, 1 page.

Han, Taedong, Exploring Price and Product Information Search Behavior in e-Market, Proceedings of the International Conference on Information Technology: Coding and Computer, Mar. 2005, 6 pages.

Just-Style: connecting to consumers, [Online], Sep. 16, 2002, Retrieved from the Internet at: http://www.just-style.com/articleprinl.aspx?id=93012 on Dec. 19, 2009,4 pages.

Kitchen & Dining, http:/fvvww.amazon.com/kitchen-dining-small-appliances-cookware/b?ie=UTF8&node=284507, at D/S.L./ least as early as Jan. 28, 2011 (3 pages).

Kohls [Online], Dec. 20, 2010, Retrieved from the Internet at: http://www.kohls.com/upgrade/webstore/home.jsp;jsessionid=3cSgNPpTqV8tRh32vBzDf2q 12xQJzpWQjD5Mpnrqlp3wtMX81Psn!-17 48685949! 105707934, 2 pages.

Kohls, Search Results for "bath towel", Retrieved Aug. 5, 2011 from the Internet at: http://www.kohls.com/upgrade/webstorelhome.jsp;jsessionid=2W1QTB, 3 pages.

Lin, Wen-Shan et al., Understanding Consumer Search Activity and Online Purchase Intensions for Improving the Product Recommendation Search, 6th IEEE/ACIS International Conference on Computer and Information Science, D, Apr. 2007, 6 pages.

Logictech Mouse Home Page, Retrieved Aug. 10, 2011 from the Internet at: http://www.logitech.com/en-us/mice-pointers/mice, 13 pages.

OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.

"Priceless Promotions," by Samantha Murphy, Chain Store Age 84. 10 (Oct. 2008): 58.

"Processors—Desktops," http :/fvvww. neweg g.com/Store/SubCategory .aspx? SubCategory=34 3&nam e=Processors—Desktops, at least as early as Dec. 30, 2010 (1 page).

Sony Notebook Home Page, Retrieved Aug. 10, 2011 from the Internet at: http://store.sony.com/webapp/wcs/stores/servlet!CategoryDisplay?catalogId=1 0551 &storeId=1 0151 &langId=-1 &categoryId=16154&SR=nav: electronics:computers:laptops:shop_compare=ss&ref=http%3A%2F%2Fwww.sony.com%2Findex.php, 5 pages.

Sonystyle, [Online], Dec. 13, 2009, Retrieved from the Internet at: http://www.sonystyle.com/webapp/wcs/stores/servlet/StoreCatalogDisplay?langId=- 1&storeId=10151 &catalogId=10551&eid=372683003, 2 pages.

Tom's Hardware Home Page, Tom's Hardware: Hardware News, Tests and Reviews, Retrieved Mar. 4, 2010 from the Internet at:: http://www.tomshardware.com/us/#redirect, 3 pages.

Jan. 28, 2013 Office Action, U.S. Appl. No. 12/973,651.

Mar. 18, 2013 Office Action, U.S. Appl. No. 12/887,098.

BabiesRus, Baby Gifts—Baby Registry at BabiesRus, [Online], Dec. 20, 2010, Retrieved from the Internet at: http://www.toysrus.com/registry/index.jsp, 1 page.

Crate&Barrel, [Online], Dec. 20, 2010, Retrieved from the Internet at: http://www.crateandbarrel.com/gift-registry/, 1 page.

Amazon.com, [Online], Dec. 20, 2010, Retrieved from the Internet at: http://www.amazon.com/gp/wedding/homepage/ref=sv_cm_gft_5, 1 page.

Macy's, [Online], Dec. 20, 2010, Retrieved from the Internet at: http://macys.com/registry/wedding/registryhome, 1 page.

http://www.target.com, Target Brands, Inc. Archived on Jul. 14, 2009 retrieved from web.archive.org/web/20090714060557/http://www.target.com, p. 1-84.

Kalbach, Designing Web Navigation, O'Reily Media, Aug. 2007, pp. 73-74; p. 90.

Meloni, Sams Teach Yourself HTML and CSS in 24 Hours, 8th ed., Sams Publishing, Dec. 2009, p. 361.

Van Duyne et al., The Design of Sites: Patterns for Creating Winning Web Sites, 2nd ed., Prentice Hall, Dec. 14, 2006, p. 677-758.

Cohen, The Unusually Useful Web Book, New Riders Publishing, Jun. 2003, p. 113-114.

Poem entitled "i carry your heart with me (i carry it in," by E.E. Cummings [On-line], Poem dated 1920. Retrieved from Internet 06-03-2-13. URL:>http://en.wikipedia.org/wiki/E._E._Cummings< . . . (12 pages, see page 5).

Office Action from Canadian Patent Application No. 145,725 mailed Oct. 1, 2012 (1 page).

Amazon, Prime Eligible Under $25, [Online], Dec. 19, 2009, Retrieved from the Internet at: http :I/www.amazon.com/s/Znode=2238906011 &field%2dprice=%2d2500&p%5t76=1, 4 pages.

Amazon, Recommended for You, [Online], Dec. 21, 2009, Retrieved from the Internet at https:I/www.amazon.com/gp/yourstore?ie=UTF8&ref_=pd%5Firi%5Fgw, 3 pages.

Gardella, Greg H., Letter to Robert T. Maldonado, Re: Huge Inventors for Target Brands, Inc. Patent Applications, Apr. 11, 2011, 5 pages.

Grannell, Craig, .net/techniques, /CSS/create a navigation bar, Sep. 2, 2007, 4 pages.

Huge, Target Patents, Target Patent Annotations, PowerPoint Slides, Mar. 28, 2011, 35 pages.

Maldonado, Robert T., Letter to Gardella, Greg H., Re: Inventor Declarations from Huge Inventors, Mar. 31, 2011, 2 pages.

Office Action from Canadian Patent Application No. 2,779,702, mailed Jul. 10, 2013 (5 pages).

Huddleston, Rob, HTML, XHTML, and CSS:Your Visual Blueprint for Designing Effective Web Pages, Jun. 3, 2008, Wiley Publishing, Inc., pp. 15, 34, 53, 138, 158, 164-165, 173-174, 195, 200, 218, 250-251, 306, 355.

Scott, Bill and Neil, Theresa, Designing Web Interfaces, Jan. 19, 2009, O'Reilly Media, Inc., pp. 147-148, 237.

Muspy, Artists [Online], Jan. 7, 2010, Retrieved from the Internet at: http://www.muspy.com/artists, 2 pages.

Online Pharmacy for Prescription Drugs—CVS Pharmacy Drug Store [Online], Dec. 21, 2009, Retrieved from the Internet at: http://www.cvs.com/CVSApp/user/home/home.jsp, 2 pages.

Organize.com, Kitchen, [Online], Dec. 20, 2009, Retrieved from the Internet at: http://www.organize.com/kitchen.html, 4 pages.

Pet, CSN Stores, [Online], Dec. 20, 2009, Retrieved from the Internet at http://www.csnstores.com/Pet-C216358.html, 2 pages.

Sam's Club, [Online], Dec. 21, 2009, Retrieved from the Internet at: http://www.samsclub.com/shopping/index.jsp, 3 pages.

Walmart, [Online], Dec. 21, 2009, Retrieved from the Internet at: http://www.walmart.com, 2 pages.

Yahoo! Small Business, Effective Navigation Bar Design, [Online], Dec. 21, 2009, Retrieved from the Internet at: http://sma llbusiness.yahoo .com/r- pfp-a- 40931-m-6-sc-37 -effective_ navigation_ b ar_ design .html, 1 page.

(56) References Cited

OTHER PUBLICATIONS

Office Action dated May 14, 2014 issued in Canadian Patent Application No. 2,779,702.

http://web.archive.org/web/20111018232514/http://www.newegg.com/Product/Product.aspx?Item=N82E16811112222&cm_sp=Cat_Computer_Cases-_-48_Hr_Sale-_-11-112-222, Oct. 18, 2011.

http://web.archive.org/web/20111020122330/http://www.newegg.com/Special/ShellShocker.asp x?cm_sp=ShellShocker-_-756293-_-10182011_1, Oct. 20, 2011.

Cascading Style Sheets, Level 2, CSS2 Specification, May 12, 1998, see: http://www.w3.org/TR/1998/REC-CSS2-19980512/.

Cascading Style Sheets, Level 2, CSS2 Specification, May 12, 1998, see http://www.w3.org/TR/1998/REC-CSS2-19980512/visuren.lltml#q5.

Cascading Style Sheets, Level 2, CSS2 Specification, May 12, 1998, see http://www.w3.orq/TR/1998/REC-CSS2-19980512/visudet.html.

http://web.archive.org/web/20111123021727/http://bucarotechelp.com/design/csseasy/91010001.asp, Nov. 23, 2011.

\* cited by examiner

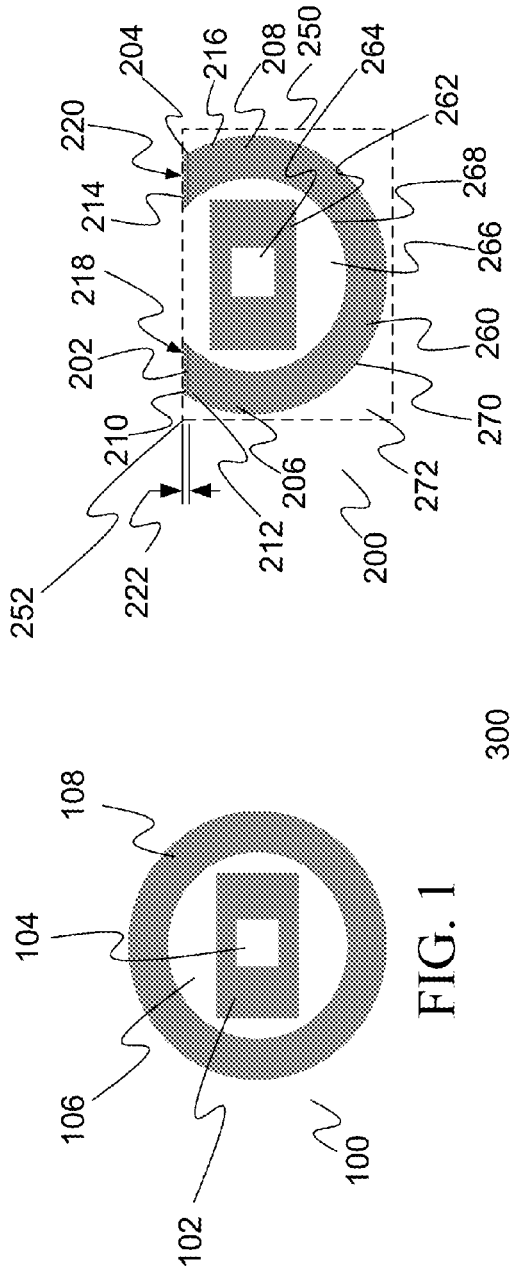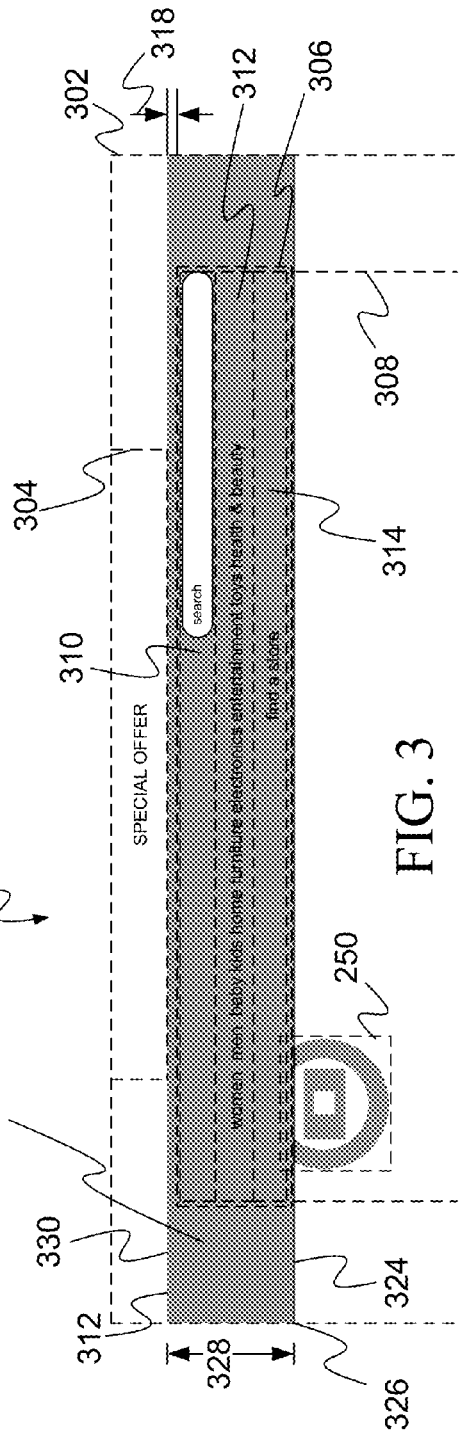

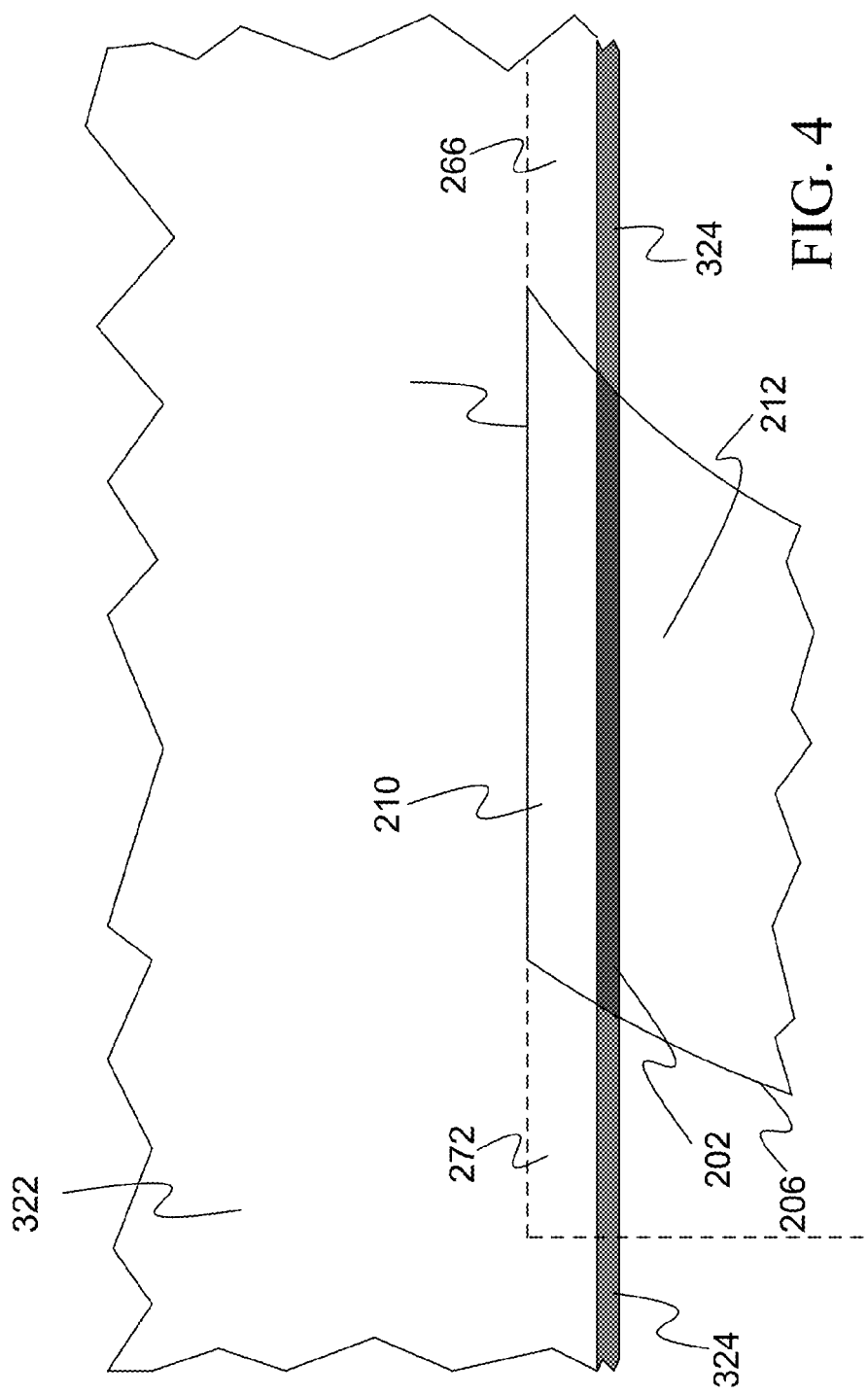

DISPLAYING PARTIAL LOGOS

BACKGROUND

Retail websites display products in a favorable manner to entice guests on the website to make purchases. In addition, the websites must clearly convey the source of the website so as to leverage brand loyalty toward the retailer. In particular, the top of the retail webpage, which is the portion that is initially shown to the guest when the webpage is rendered on the screen, should indicate the source of the webpage and display products in an enticing manner.

The discussion above is merely provided for general background information and is not intended to be used as an aid in determining the scope of the claimed subject matter. The claimed subject matter is not limited to implementations that solve any or all disadvantages noted in the background.

SUMMARY

A request for a web page is received from a client and a set of products to be displayed in the web page is identified. An image of a partial logo and an image of a graphical element are provided to the client. The image of the partial logo and the image of the graphical element such that when the image of the partial logo and the image of the graphical element are displayed in the web page, the graphical element appears to be on top of part of a full logo such that only the partial logo is visible and such that the partial logo designates a source of the web page. Images of the products are also provided to the client.

In accordance with a further embodiment, instructions for displaying elements on a web page are retrieved from a computer memory. The instructions comprise a definition of a first container and a definition of a second container. The definition of the first container being within the definition of the second container. The definition of the first container and the definition of the second container are such that the first container is defined as extending outside a defined perimeter of the second container and such that elements in the first container will be rendered above elements in any other container displayed on the web page. The instructions are sent to a client using a processor. A first image to be displayed in the first container and a second image to be displayed in a third container are retrieved from a computer memory. The first image comprises a portion of a logo with a separating element and the second image comprising a graphical element such that when the first image and the second image are rendered on a display, the portion of the logo extends from the graphical element with the separating element positioned at an edge of the graphical element. The first image and the second image are sent to a client using a processor.

In a computing system, a memory stores images and a processor serves elements of a web page to a client. The processor serves instructions that describe a position of a banner having a shadow line and that describe a position of an image of a partial logo having a line crossing at least part of the partial logo. The position of the image of the partial logo is based on the position of the banner, a dimension of the banner, and a position of the line crossing the partial logo. The processor retrieves an image of the banner having the shadow line and serves the image of the banner having the shadow line. The processor retrieves an image of the partial logo and serves the image of the partial logo.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an illustration of a full logo.
FIG. 2 is an illustration of a partial logo with two transecting lines.
FIG. 3 is an illustration of a banner.
FIG. 4 is an expanded view of a portion of the partial logo and banner of FIG. 3
FIGS. 8-1, 8-2, and 8-3 are illustrations of a webpage showing an animation in accordance with one embodiment.

DETAILED DESCRIPTION

Embodiments described below provide means for conveying the source of a webpage while increasing the amount of space available to display products on a retail webpage, particularly at the top of the webpage such that users can view products in the most enticing light without having to scroll down the page. Further, the embodiments described below provide depth to a retail webpage by making it appear as if a well-known logo is being partially covered by a banner on the page. In accordance with one embodiment, this is done by rendering a partial logo on top of a banner while aligning a line that crosses the partial logo with a shadow line along an edge of the banner.

Figures 1, 8:
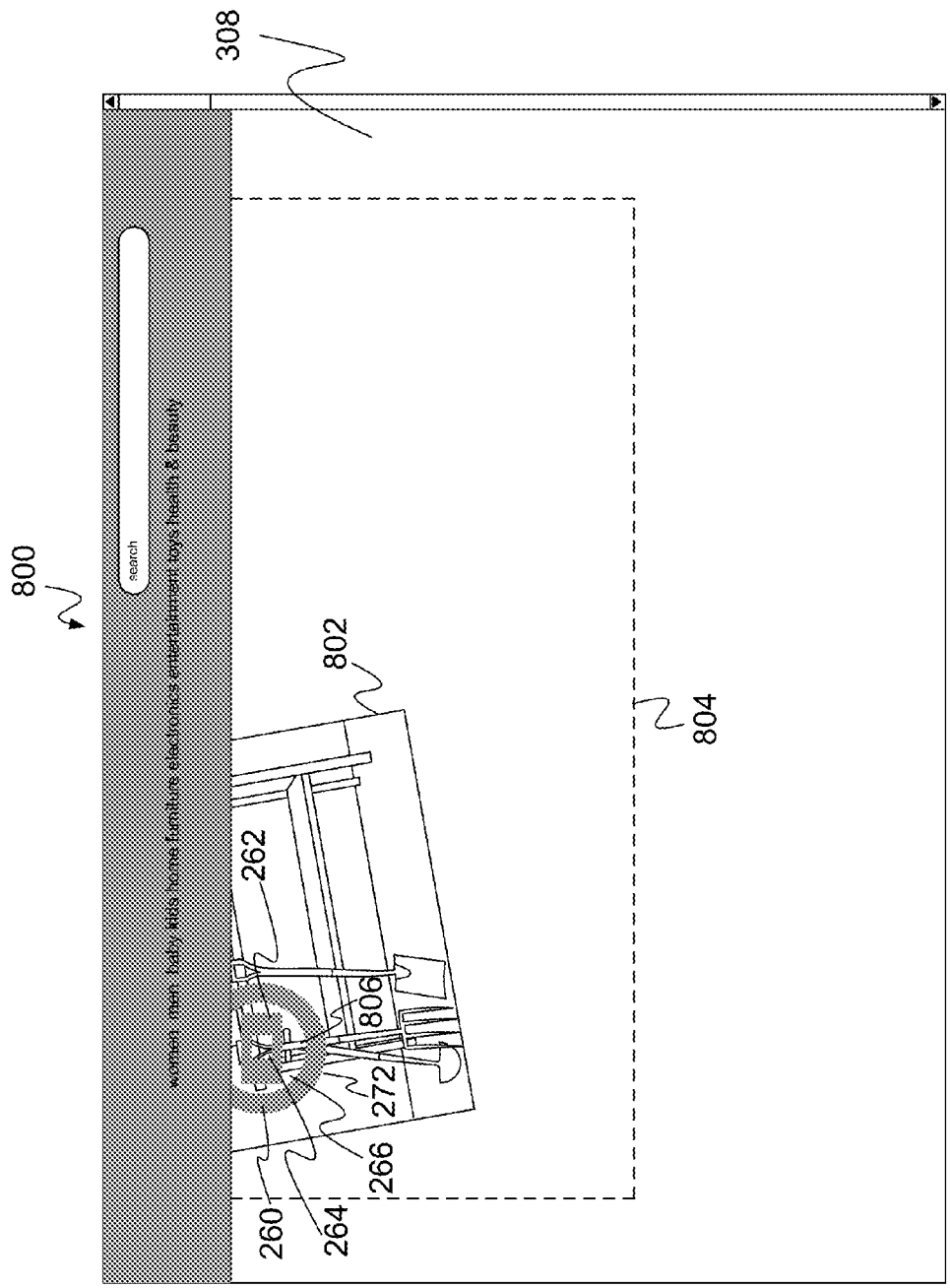

FIG. 1 provides an illustration of a full logo 100. Logo 100 is an example of a logo that has been associated with a particular retailer and which, by itself, designates that products or webpages are being provided by the retailer associated with the logo. Such logos typically are not only recognized by consumers but have developed a level of good will with consumers so that consumers are more likely to buy products from a website if it contains the full logo.

Logo 100 includes an inner colored shape 102 that surrounds a center white section 104; a second white section 106 that surrounds inner colored shape 102; and an outer colored shape 108 that surrounds second white section 106.

Figures 2, 8:
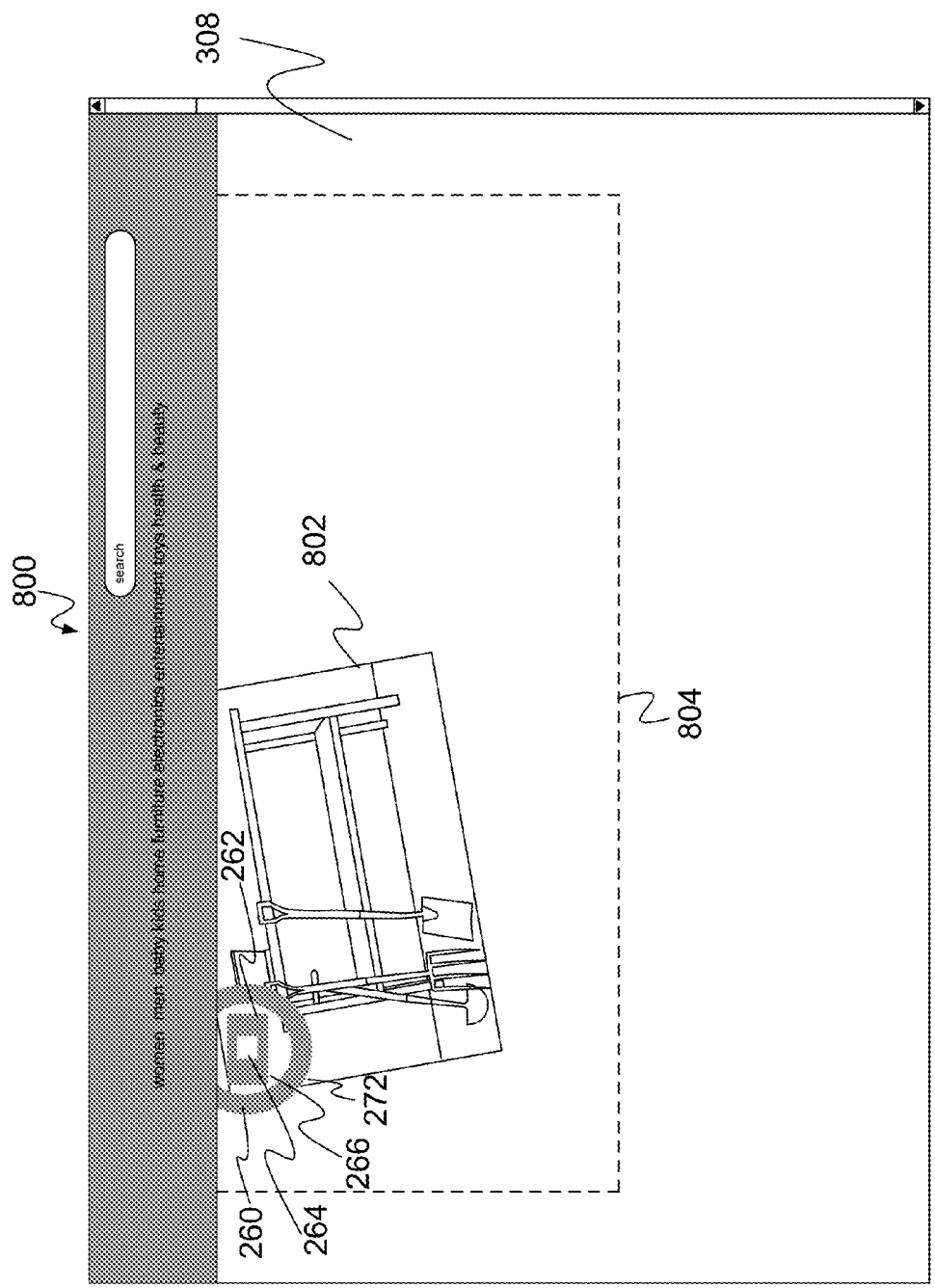

FIG. 2 provides an illustration of a partial logo 200 having an inner shape 262 that surrounds a center transparent section 264; a second transparent section 266 that surrounds inner shape 262; an outer shape 260 that has an inner edge 268 that is in contact with the second transparent section 266 and an outer edge 270 that is in contact with an outer transparent section 272. Partial logo 200 also includes two transecting lines 202 and 204 that transect portions 206 and 208 of outer shape 260. Transected portion 206 has an upper part 210 that is separated from a lower part 212 by transecting line 202 and transected part 208 has an upper part 214 that is separated from a lower part 216 by transecting line 204. Upper parts 210 and 214 have upper ends 218 and 220, respectively, which are separated from transecting lines 202 and 204 by a distance 222.

Partial logo 200 is defined within and occupies the entirety of a rectangular image box or container 250 shown in dotted lines. Outer transparent section 272 extends to the left side, the right side, the bottom and the top of container 250. Upper parts 210 and 214 of outer shape 260 and second transparent section 266 also extend to the top of container 250.

Inner shape 262 and outer shape 260 are opaque and are filled with either a solid color or a pattern. Center transparent section 264, second transparent section 266 and outer transparent section 272 are each transparent such that any image or video displayed beneath these areas of partial logo 200 appear through partial logo 200.

Although particular shapes for logo 100 and partial logo 200 are shown in FIG. 1 and FIG. 2, those skilled in the art will recognize that the logos may have any desired shape or imagery and the shapes provided in FIGS. 1 and 2 are only provided as examples. Further, although the colored shapes are shown to be the same color in FIGS. 1 and 2, different shapes may have different colors in other embodiments.

Figures 3, 8:
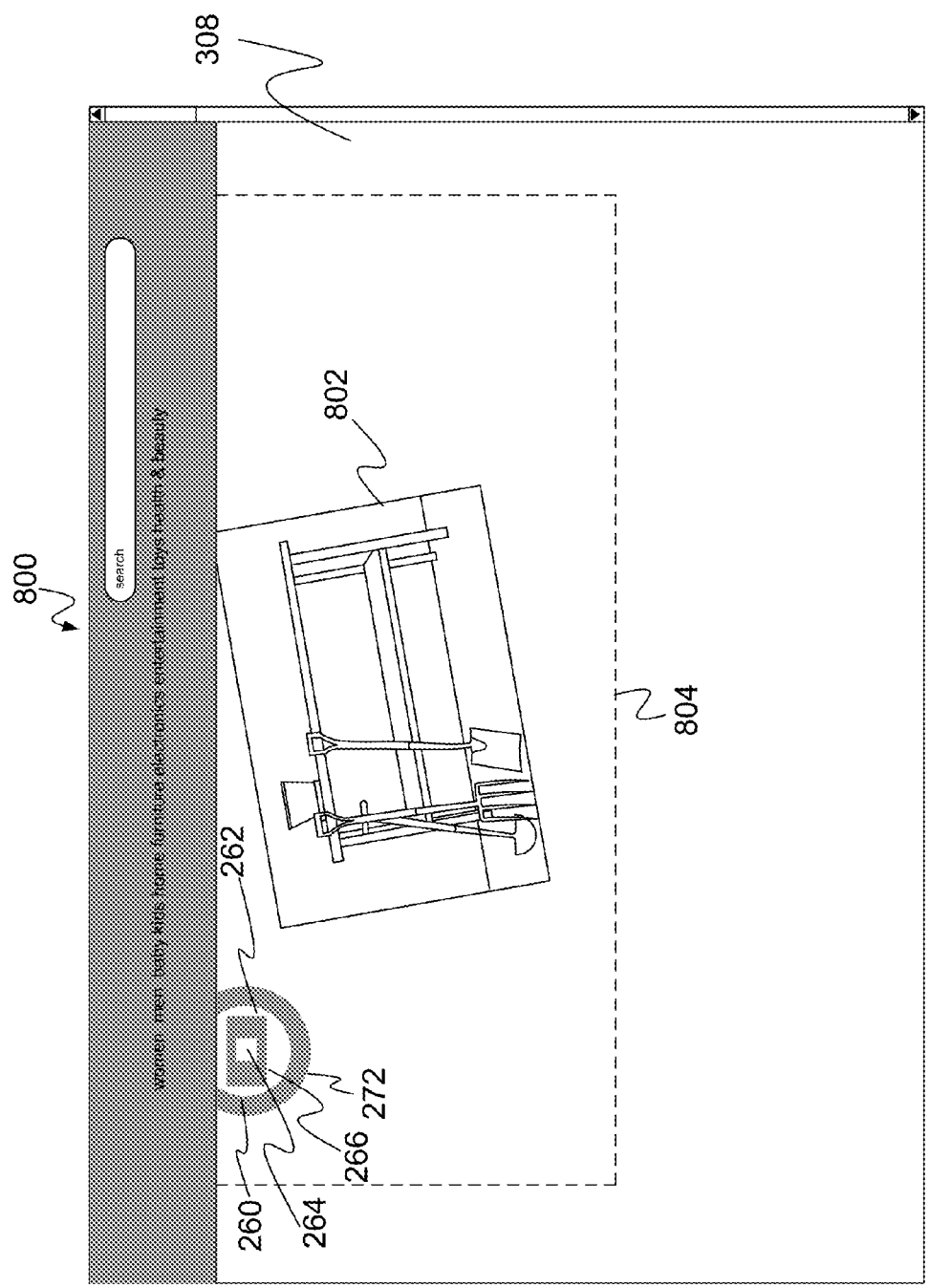

FIG. 3 provides an illustration of a portion of a web page 300 that contains a collection of divisions or containers. In HTML coding, each division or container is defined within <DIV> tags. Attribute variables within the <DIV> tags can define aspects of the container such as the x, y position of the upper left corner of the container, the height of the container, the width of the container, the z-index, the margins around the outside of the perimeter of the container, and the padding within the perimeter of the container, for example. The margins around the container define the distance between the container and neighboring elements on the page. If the margins are set to zero, the container and the neighboring elements are positioned immediately adjacent to each other. The padding within the perimeter defines spacing between the perimeter of the container and elements within the container. The z-index defines a layer level for the container such that if two containers overlap, the container with the higher z-index value will be displayed on top of the container with the lower z-index value. <DIV> tags may be nested such that one container is said to be within another container. The position of nested containers may be defined relative to the containers that contain them.

In FIG. 3, web page 300 comprises an outer container 302 that contains a special offer container 304, a header container 306, and a content container 308. Header container 306 contains search container 310, main menu container 312, secondary menu container 314 and partial logo container 250. Note that although partial logo container 250 is defined as being nested within header container 306, a majority of partial logo container 250 extends outside of header container 306. In addition, partial logo container 250 has a z-index value that ensures that partial logo container 250 is displayed over all other content on the page. In accordance with one embodiment, partial logo container 250 is given a z-index value of 700.

Special offer container 304 is positioned at the top of outer container 302 and is centered within outer container 302. Header container 306 is positioned below special offer container 304 and is also centered within outer container 302. Header container 306 includes a top margin 318 that separates header container 306 from special offer container 304. Those skilled in the art will recognize that top margin 318 is not necessary and that the size of header container 306 could be changed to provide the desired spacing for the page. Content container 308 is positioned below header container 306 and is also centered within outer container 302. Because content container 308 is positioned below header container 306, partial logo container 250 displays over both header container 306 and content container 308. In the transparent areas of partial logo container 250, the portions of header container 306 and content container 308 that are below partial logo container 250 are visible through partial logo container 250.

Outer container 302 also contains a background image 320 of a banner consisting of a solid-colored banner body 322 and a shadow line 324 at a bottom of banner body 322. Banner body 322 is a first color and shadow line 324 is a second color that is darker than the first color. Background image 320 has a height 328 measured from a top 330 to a bottom 326.

Background image 320, header container 306 and partial logo container 250 are positioned relative to each other such that transecting lines 202 and 204 of partial logo 200 are aligned with shadow line 324 at an edge of banner body 322 of background image 320.

FIG. 4 provides an expanded view of the alignment between line 202 and shadow line 324. As shown in FIG. 4, line 202 is aligned with shadow line 324 such that they appear to be the same line that turns darker over portion 206 of the partial logo. By making lines 202 and 204 darker than shadow line 324, it appears that banner body 322 is casting a shadow on partial logo 200. In addition, it can be seen that upper part 210 of partial logo 200 is displayed or rendered on top of banner body 322. In FIG. 4, an outline 400 of the portion of partial logo 200 displayed over banner body 322 has been provided. However, those skilled in the art will recognize that such an outline is not present and is only being used to illustrate the position of partial logo 200 on banner body 322. In accordance with most embodiments, upper part 210 of partial logo 200, which is rendered on top of banner body 322, is the same color as banner body 322 and as such cannot be seen on the webpage as indicated in FIG. 3. Thus, although a portion of partial logo 200 is rendered on top of a portion of banner body/graphical element 322, lines 202 and 324 make it appear as if partial logo 200 is underneath banner body 322. In addition, portions of banner body 322 and shadow line 324 that are overlapped by second transparent section 266 and outer transparent section 272 of partial logo 200 are visible through partial logo 200.

Figure 5:
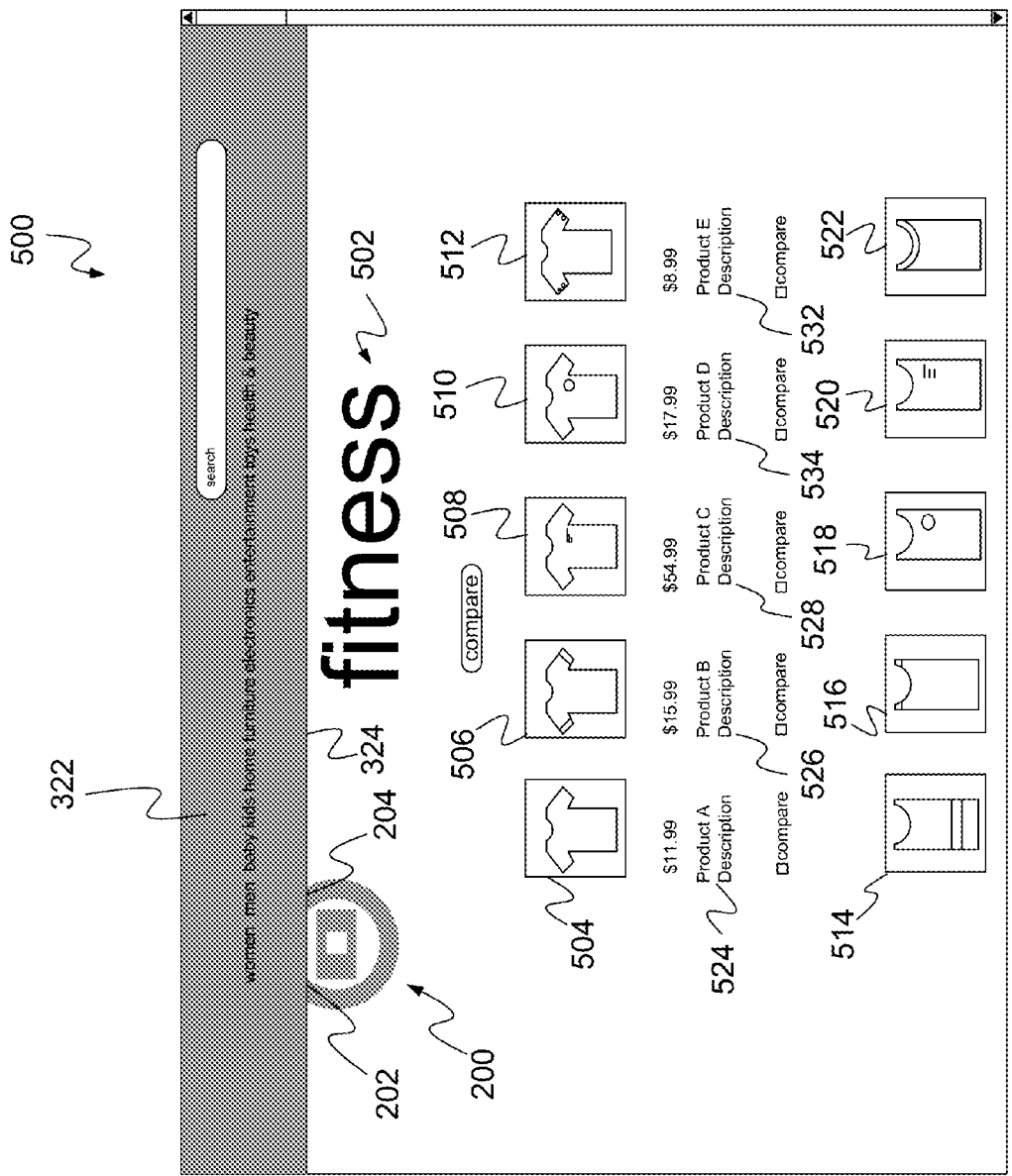
FIG. 5 is an illustration of a display showing a first collection of products and a partially obscured logo.

FIG. 5 provides an illustration of a webpage 500 rendered on a display. Webpage 500 includes banner body 322, shadow line 324, partial logo 200, heading 502 and product images 504, 506, 508, 510, 512, 514, 516, 518, 520 and 522. Webpage 500 also includes product descriptions 524, 526, 528, 530 and 532. In FIG. 5, partial logo 200 is positioned relative to banner body 322 such that lines 202 and 204 of partial logo 200 are aligned with shadow line 324. As a result, partial logo 200, banner body 322 and shadow line 324 make it appear as if banner body 322 is on top of an unseen part of full logo 100 of FIG. 1 such that only the partial logo is visible. In addition, lines 202 and 204 act as separating elements that distinguish banner body 322 from the portion of partial logo 200 that extends from banner body 322. Lines 202 and 204 indicate that banner body 322 is a separate element from partial logo 200.

By using partial logo 200 instead of showing full logo 100 of FIG. 1, the embodiment shown in FIG. 5 uses less space to show banner body 322 and to convey the source of the webpage than if full logo 100 were displayed separately from banner body 322. This provides more space at the top of the web page to display the product images 504-522 in a desired manner. In addition, by displaying partial logo 200 with a large z-index value such that partial logo 200 is not overlapped by other elements on webpage 500, the content in the webpage below banner body 322 may be positioned without the possibility of covering partial logo 200 with other content.

Figure 6:
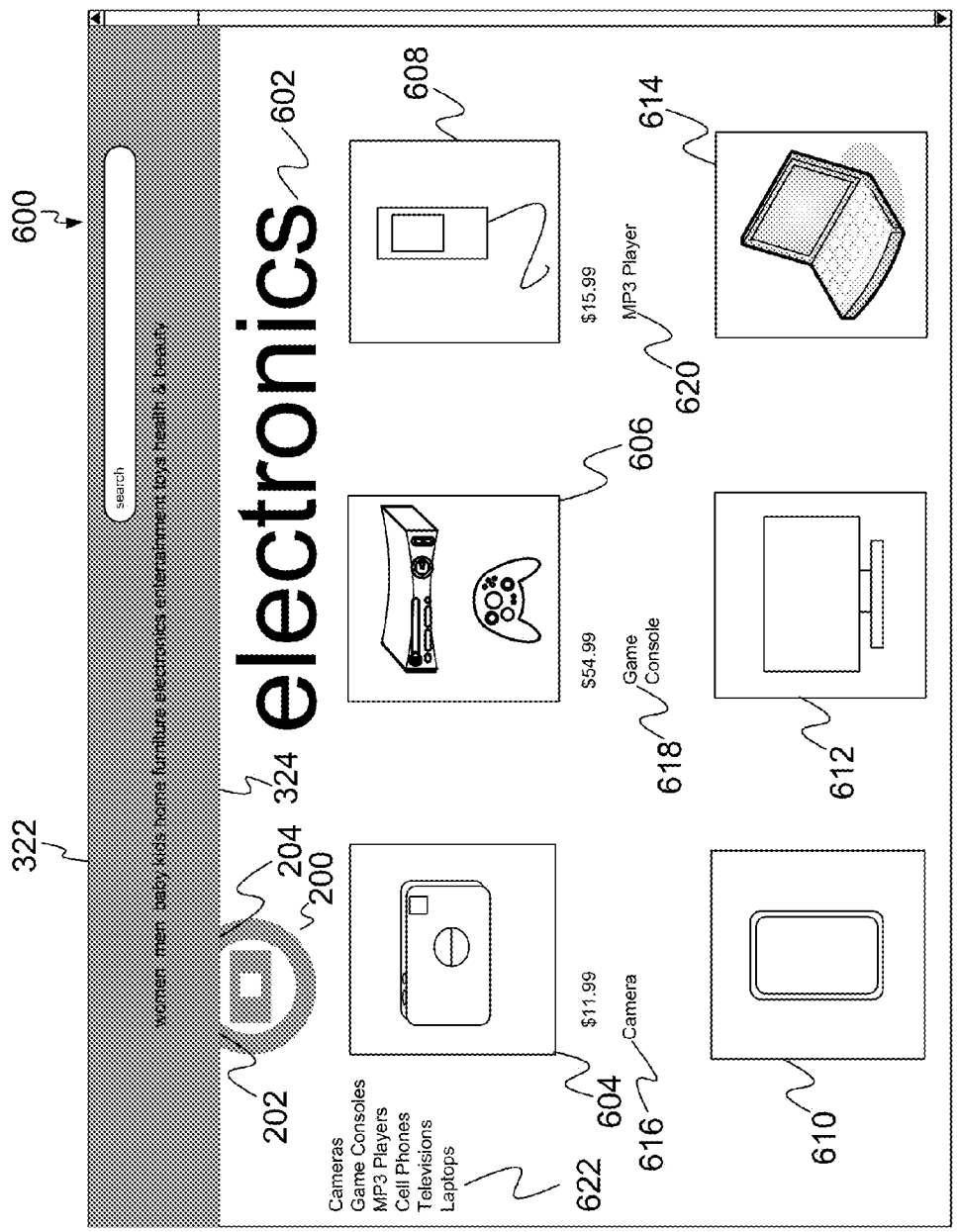
FIG. 6 is an illustration of a display showing a second collection of products and a partially obscured logo.

FIG. 6 provides an illustration of a second webpage 600. Webpage 600 includes banner body 322, partial logo 200 as well as heading 602, product images 604, 606, 608, 610, 612 and 614, product descriptions 616, 618 and 620, and category list 622.

In FIG. 6, lines 202 and 204 of partial logo 200 are aligned with shadow line 324 at the bottom of banner body 322. Lines 202 and 204 make it appear as if banner body 322 is covering or obscuring an unseen portion of logo 100. By using partial logo 200 instead of full logo 100 in conjunction with banner body 322 and shadow line 324, the embodiment of FIG. 6 reduces the space necessary to convey the source of the webpage thereby allowing the products more room to be displayed in a pleasing manner. In addition, by displaying partial logo 200 with a large z-index value such that partial logo 200 is not overlapped by other elements on webpage 600, the content in the webpage below banner body 322 may be positioned without the possibility of covering partial logo 200 with other content.

Figure 7:
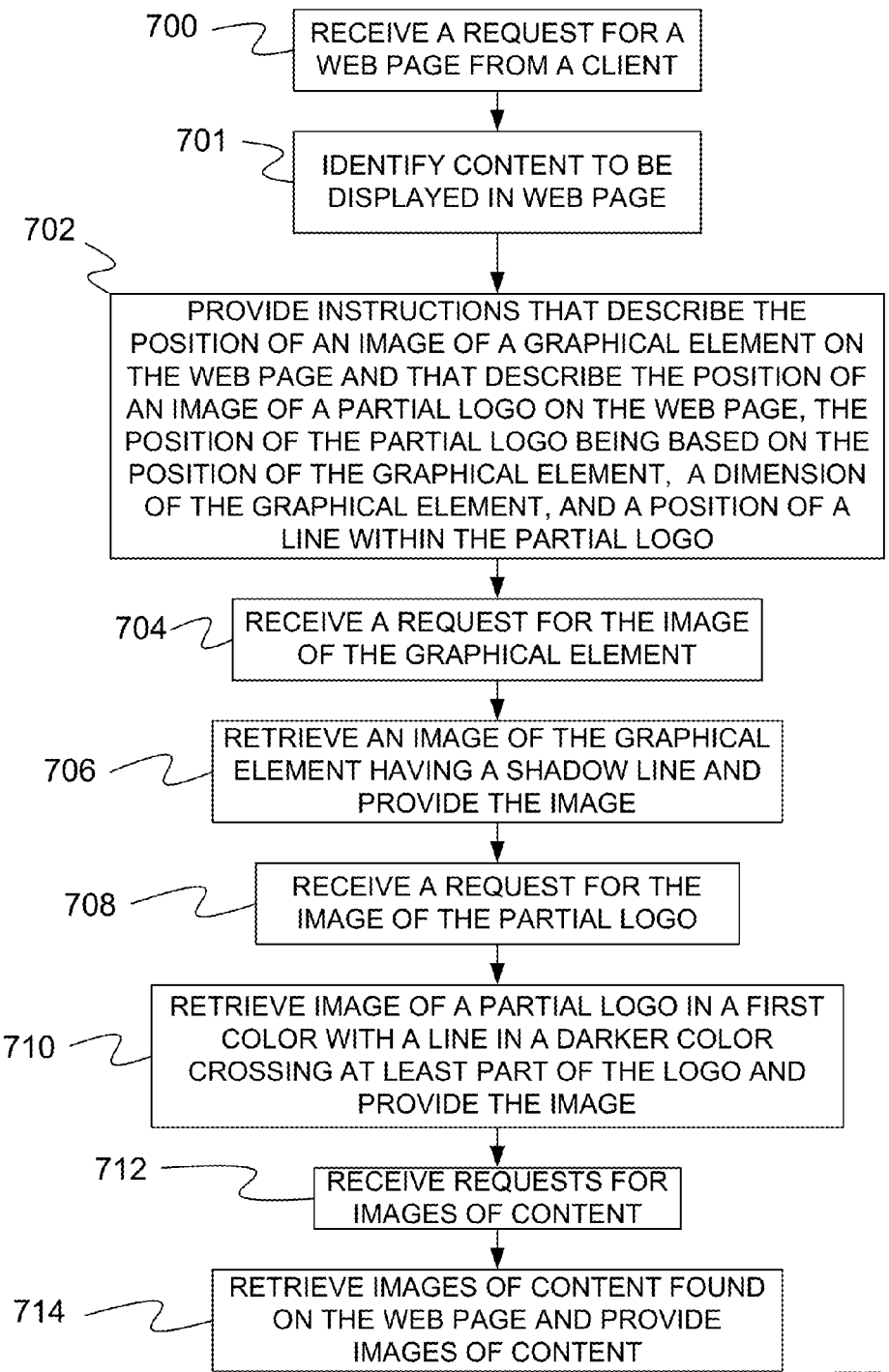
FIG. 7 is a flow diagram of a method of serving a webpage in accordance with one embodiment.

FIG. 7 provides a flow diagram of a method in accordance with one embodiment. In FIG. 7, a webpage server receives a request for a webpage from a client device at step 700. In response to the received request, the server identifies content to be displayed in a content container of the web page at step 701. In accordance with one embodiment, the content comprises a set of products. The server then provides instructions at step 702 that describe the position of an image of a banner on the webpage and that describe the position of an image of a partial logo on the webpage where the position of the partial logo is based on the position of the banner, one dimension of the banner and a position of transecting lines within the partial logo. For example, the position of the partial logo can be determined based on the position of the image of the banner as described by the coordinates of an upper left corner 312 of image 320 (FIG. 3), one dimension of the image of the banner consisting of the height 328 of the image 320 of the banner (FIG. 3) and the position of the transecting lines within the partial logo, which is the vertical distance 222 between the vertical coordinate of corner 252 of image box 250 and the vertical positions of lines 202 and 204. Using these exemplary values, the position of corner 252 of image box 250 is determined such that lines 202 and 204 align with shadow line 324 of banner image 320.

Note that although the Figures above describe the partial logo as extending from the bottom of banner image 320, in other embodiments, the partial logo may extend from the top of banner image 320 or from a side of banner image 320. Also, although a banner is shown in the Figures above, other graphical elements may be used instead of a banner and may be positioned relative to the partial logo to convey that the graphical element overlays and partially obscures a full logo.

At step 704, the server receives a request for the image of the banner from the client and at step 706, the server retrieves the image of the banner having a shadow line from memory and provides the image to the client. At step 708, the server receives a request for the image of the partial logo and at step 710, the server retrieves the image of the partial logo from memory and provides the image to the client. The partial logo is typically in a first color with the lines 202 and 204 in a second, darker color than the part of the partial logo that the lines cross over.

At step 712, the server receives a request for images of content to be displayed on the webpage and at step 714, the server retrieves the images of the content from memory and serves/provides them to the client. In accordance with one embodiment, the images of the content comprise images of products.

The steps of FIG. 7 may be repeated for different webpages using different layouts and different images of products while maintaining the relationship between the banner and the partial logo as shown in FIGS. 5 and 6.

FIGS. 8-1, 8-2 and 8-3 show a web page 800 containing an animation in content container 308. Each of FIGS. 8-1, 8-2 and 8-3 show a different stage in the animation, which progresses from FIG. 8-1 to FIG. 8-2 and finally to FIG. 8-3. In the animation, an image 802, showing a garden table with gardening implements resting against it, moves from left-to-right and downward.

In FIGS. 8-1, 8-2 and 8-3, the animation takes place within an animation container 804, which has a z-index value that is smaller than the z-index value of partial logo container 250. As a result, partial logo 200 overlays the animation in animation container 804 such that the portions of image 802 that are underneath inner shape 262 or outer shape 260 of partial logo 200 are not visible while the portions of image 800 that are below transparent sections 264, 266 or 272 of partial logo 200 are visible.

For example, in FIG. 8-1 a handle 806 of a gardening implement can be seen in transparent sections 264, 266, and 272. However the portions of handle 806 that are underneath inner shape 262 and outer shape 260 are not visible.

Figure 9:
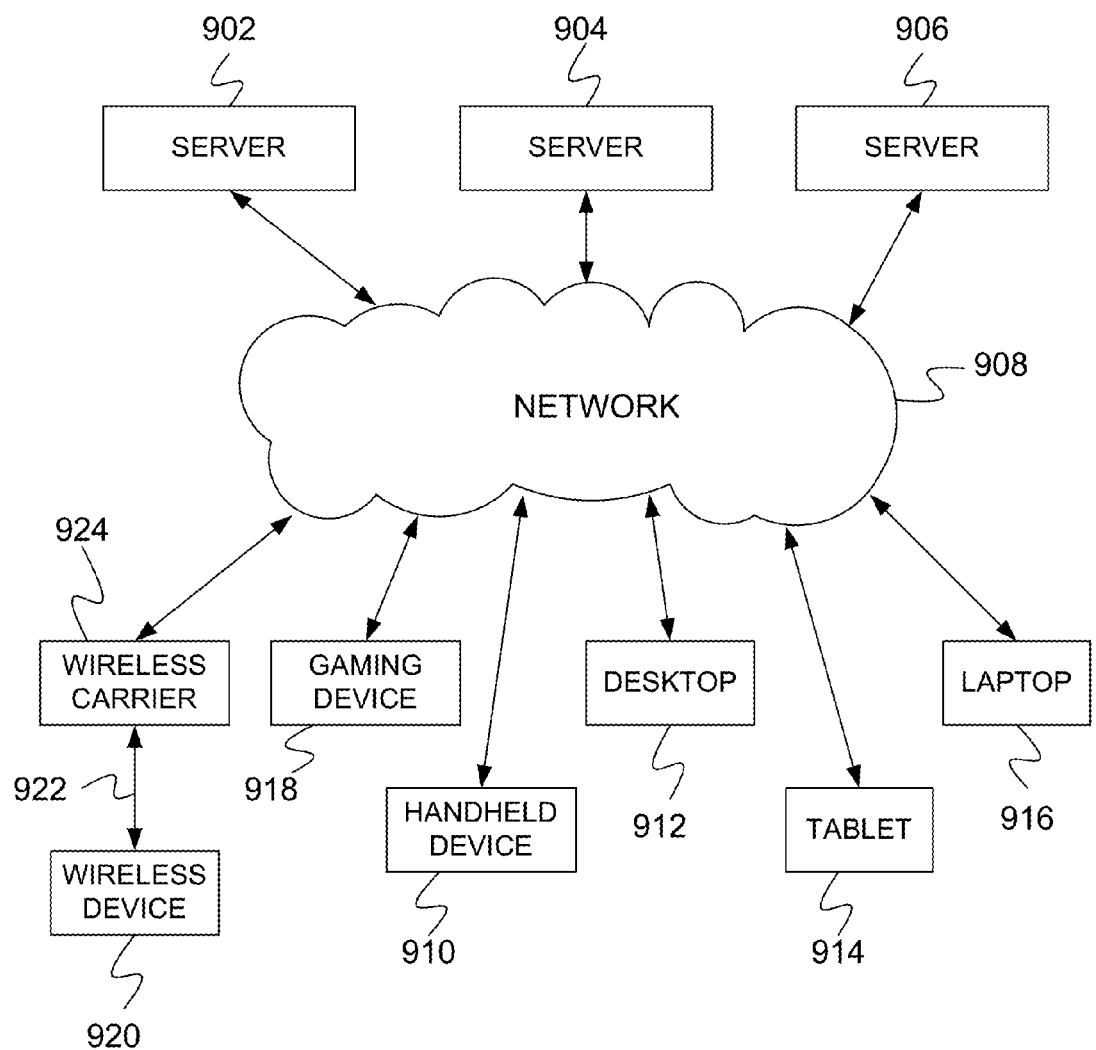
FIG. 9 is a block diagram of a network environment.

FIG. 9 provides a block diagram of a network environment which embodiments may be practiced. In FIG. 9, a collection of servers 902, 904 and 906 store one or more webpages that can be requested by client devices through a network connection 908. Such network connections can include the Internet or other wide area networks or an intranet or other local area networks. Client devices can include, for example, handheld device 910, desktop 912, tablet 914, laptop 916, gaming device 918 or a wireless device 920. Wireless device 920, including such devices as cellular phones, can request webpages through a cellular connection 922 to a wireless carrier 924, which is connected to the network 908. The client devices listed for FIG. 9 are examples of available client devices and other client devices that are capable of connecting through a network 908 to one or more servers 902, 904 and 906 can be used.

Communication along network 908 can utilize one or more protocols including Hypertext Transfer Protocol (http), Transmission Control Protocol/Internet Protocol (TCP/IP) and the like. The web pages provided by servers 902, 904 and 906 may be written in a mark-up language such as Hypertext Markup Language (HTML) or Extensible Markup Language (XML) and may utilize one or more Cascade Style Sheets. In addition, the web pages provided by servers 902, 904 and 906 may use one or more scripts for rendering the page including for example JavaScript®, from Oracle Corporation.

The position of the partial logo relative to the banner may be described in terms of absolute position coordinates or relative coordinates. Further, the positioning may be set within the web page or may be determined dynamically in a script.

Figure 10:
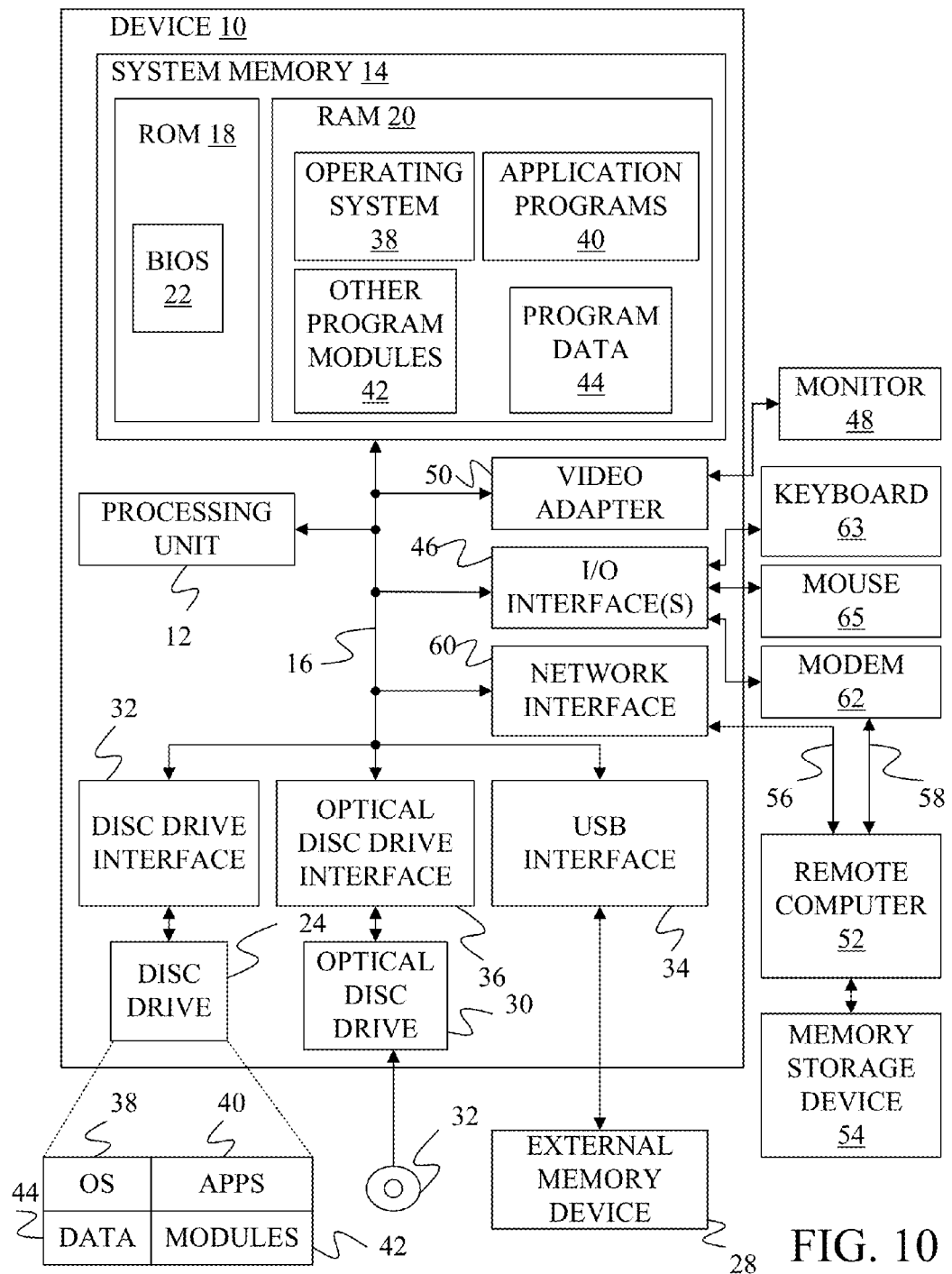
FIG. 10 is a block diagram of an example of a computing device that may be used as either a server or a client device.

An example of a computing device that can be used as a server and/or client device in the various embodiments is shown in the block diagram of FIG. 10. The computing device 10 of FIG. 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include server instructions that handle requests for web pages from a client, retrieve the content of the web pages and serve the web pages to the client when the computing device is used as a server. When the computing device is used as a client, application programs 40 can include a web browser that receives, interprets and renders one or more of the web pages described above. Such web browsers include script interpreters that are able to interpret script code in the web pages. The combination of the web browser and any script code in the web page can be considered computer-executable instructions that are stored on a computer-storage medium for execution by a processor. Program data 44 may include images and text that form one or more of the web pages including images of the banner, the partial logo and the products.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 10. The network connections depicted in FIG. 10 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 10 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer storage medium having computer executable instructions that when executed by a processor cause the processor to perform steps comprising:
   receiving a request for a web page from a client;
   identifying a set of products to be displayed in the web page;
   providing to the client an image of a partial logo as part of the web page such that the partial logo designates a source of the web page, the image of the partial logo comprising at least one transparent portion; and
   providing to the client an animation as part of the web page, the animation comprising movement of at least one product in the set of products such that the partial logo is positioned over at least part of the animation and such that portions of the animation are rendered in transparent portions of the partial logo.

2. The computer storage medium of claim 1 further comprising providing an image of a graphical element having a shadow line as part of the web page.

3. The computer storage medium of claim 2 wherein the image of the partial logo further comprises a line that crosses over at least part of the partial logo.

4. The computer storage medium of claim 3 wherein the line that crosses over at least part of the partial logo is a darker color than the part of the partial logo that the line crosses over.

5. The computer storage medium of claim 3 further comprising providing instructions that describe the position of the image of the partial logo and the position of the image of the graphical element such that the line that crosses over at least part of the partial logo is aligned with the shadow line of the graphical element.

6. The computer storage medium of claim 5 wherein a portion of the image of the partial logo is rendered on top of a portion of the image of the graphical element.

7. The computer storage medium of claim 6 wherein providing instructions that describe the position of the image of the partial logo comprises providing instructions that describe a z-index of the partial logo as being greater than a z-index of any other element on the page.

8. The computer storage medium of claim 7 wherein providing instructions that describe the position of the image of the partial logo and the position of the graphical element comprises providing instructions that position the image of the partial logo and position the graphical element such that the graphical element appears to be on top of part of a full logo so that only the partial logo is visible.

9. The computer storage medium of claim 4 wherein the line that crosses over at least part of the partial logo is darker than the shadow line of the graphical element.

10. A method comprising:
retrieving from a computer memory instructions for displaying elements on a web page, the instructions comprising a definition of a first container and a definition of a second container, the definition of the first container being within the definition of the second container, the definition of the first container and the definition of the second container being such that the first container is defined as extending outside a defined perimeter of the second container and such that elements in the first container will be rendered above elements in any other container displayed on the web page;
sending the instructions to a client using a processor;
retrieving from a computer memory a first image to be displayed in the first container and a second image to be displayed in a third container, the first image comprising a portion of a logo with a separating element and the second image comprising a graphical element such that when the first image and the second image are rendered on a display, the portion of the logo extends from the graphical element with the separating element positioned at an edge of the graphical element;
sending the first image and the second image to a client using a processor.

11. The method of claim 10 wherein the separating element comprises a straight line that crosses the portion of the logo, the portion of the logo is a first segment of a full logo having the first segment and a second segment, the full logo identifying source of origin of goods or services, and the first container has a width less than the second container.

12. The method of claim 11 wherein the graphical element is the same color as a part of the portion of the logo that overlaps the graphical element and wherein the straight line indicates that the graphical element and the portion of the logo are separate elements.

13. The method of claim 12 wherein the straight line makes it appear as if the graphical element is covering a second unseen portion of the logo.

14. The method of claim 13 wherein the instructions further comprise a definition of a fourth container such that the first container overlaps the fourth container and the fourth container is separate from the second container and the method further comprises retrieving a third image from memory and sending the third image to the client using the processor such that a portion of the third image will be seen through a portion of the first image.

15. A computing system, the computing system comprising:
a memory storing images;
a processor serving elements of a web page to a client by:
serving instructions that describe a position of a banner having a shadow line and that describe a position of an image of a partial logo having a straight line crossing at least part of the partial logo such that a first segment of the partial logo extends above the straight line and a second segment of the partial logo extends below the straight line, wherein the position of the image of the partial logo is based on the position of the banner, a dimension of the banner, and a position of the straight line crossing the partial logo;
retrieving an image of the banner having the shadow line;
serving the image of the banner having the shadow line;
retrieving an image of the partial logo; and
serving the image of the partial logo such that straight line crossing the partial logo is aligned with the shadow line and the first segment of the partial logo overlaps at least a portion of the banner.

16. The computing system of claim 15 wherein the position of the partial logo and the position of the banner are such that the straight line crossing at least part of the partial logo is aligned with the shadow line of the banner, the straight line crossing at least part of the partial logo is a horizontally extending straight line.

17. The computing system of claim 16 wherein the instructions further describe a first container that contains the image of the partial logo such that the container is given a z-index that is higher than a z-index of any other element on the web page.

18. The computing system of claim 17 wherein the instructions further describe a second container that is overlapped by the first container, wherein the second container is defined as containing at least one image that is overlapped by the partial logo such that part of the at least one image appears through a transparent part of the partial logo.

19. The computing system of claim 18 wherein the at least one image that is overlapped by the partial logo comprises an animation.

20. The computing system of claim 16 wherein the straight line crossing the partial logo is a darker color than the shadow line.

* * * * *